Figure 4:
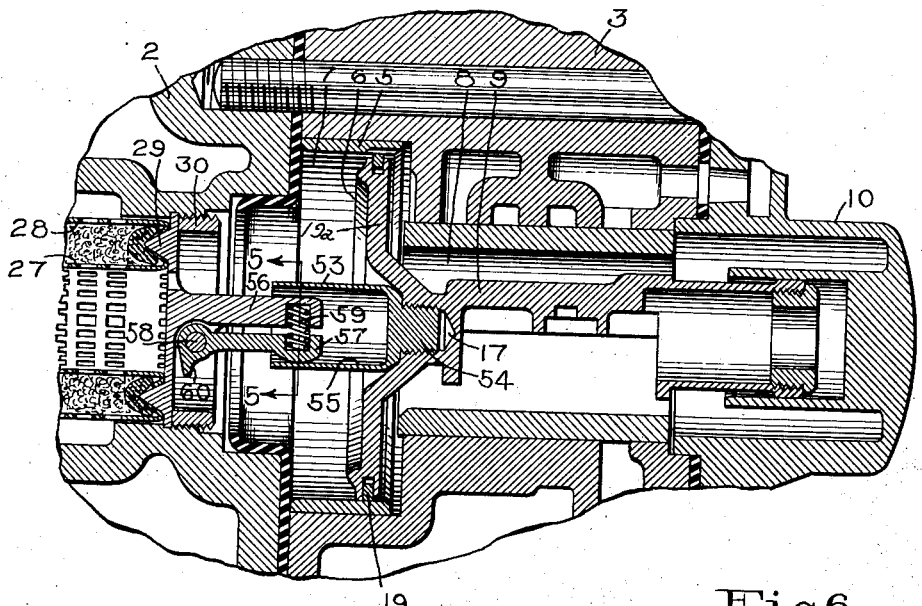

June 27, 1944. J. N. GOOD 2,352,259
VALVE DEVICE
Filed May 27, 1942 3 Sheets-Sheet 1
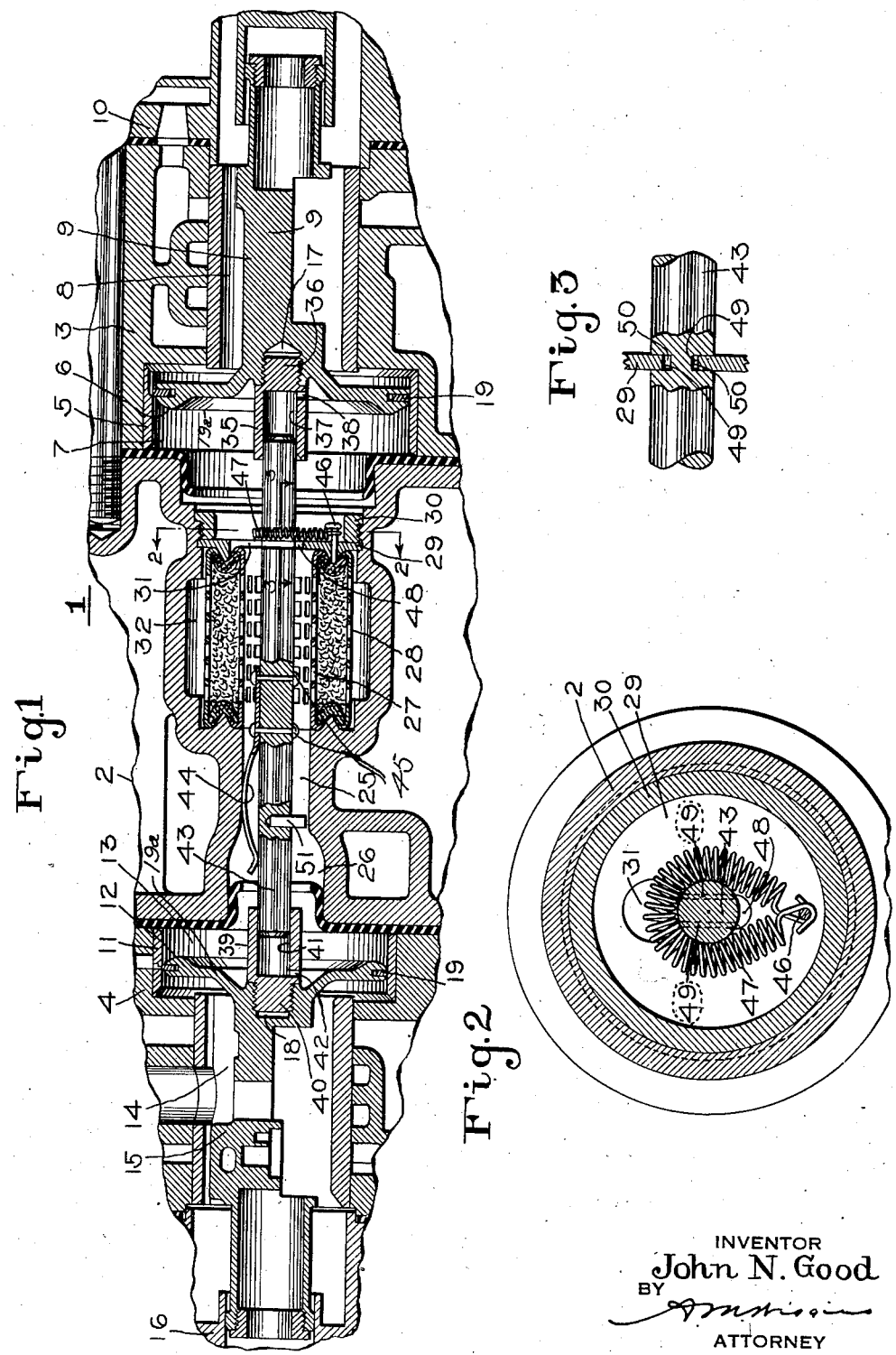
INVENTOR
John N. Good
BY
ATTORNEY June 27, 1944.  J. N. GOOD  2,352,259
VALVE DEVICE
Filed May 27, 1942   3 Sheets-Sheet 2

INVENTOR
John N. Good
BY
ATTORNEY

June 27, 1944.  J. N. GOOD  2,352,259
VALVE DEVICE
Filed May 27, 1942  3 Sheets-Sheet 3

INVENTOR
John N. Good
BY
ATTORNEY

Patented June 27, 1944

2,352,259

UNITED STATES PATENT OFFICE 2,352,259

VALVE DEVICE

John N. Good, Wilmerding, Pa., assignor to The Westinghouse Air Brake Company, Wilmerding, Pa., a corporation of Pennsylvania Application May 27, 1942, Serial No. 444,666

20 Claims. (Cl. 303—1)

This invention relates to valve devices and more particularly to the type embodying a piston arranged to be moved by a differential between fluid pressures acting on its opposite sides.

In air brake devices, such as employed on railway vehicles, pistons are employed for operation upon a change in air pressure in a control pipe and thereby on one side of the piston, to effect an application of the brakes on the vehicle, a release of the brakes, or other desired brake controlling operations. The pistons are arranged to reciprocate in cylinder bores and, in accordance with usual practice the pistons comprise piston heads of a diameter somewhat less than that of the bores and each head is therefore provided with a ring groove carrying a ring which is expanded into contact with the wall of the respective bore to provide a leak tight seal between the piston and the wall.

Due to the fact that the diameter of a piston head such as above described is slightly less than that of the bore in which it operates, the piston head is capable of a certain degree of radial movement relative to the ring and the wall of the piston bore. This relative movement is slight and resisted by friction between the ring and the side walls of the ring groove in the piston head. Nevertheless, in a brake device applied to a railway vehicle which at times is subject to severe shocks, due for instance to the vehicle wheels striking uneven joints between the rails in a track, the resulting vibrations set up in the vehicle are liable to cause such relative movement between a piston head and the wall of the bore in which it operates as to undesirably create hammer-like blows between the piston head and said wall. In time these blows may result in a groove being formed in the wall of the bore at either side of the ring where the piston head comes in contact with said wall. If the piston is arranged with its axis horizontal the grooves may be formed only in one side of the cylinder wall, but if its axis is vertical, the grooves may extend completely around the wall. In devices such as triple valves, this grooving of the piston cylinder wall is most likely to occur in the brake release position of the piston since the piston occupies this position the major portion of the time that a vehicle is in use.

This grooving of a cylinder wall is of course very objectionable, particularly in air brake devices, because it tends to create or increase leakage of fluid under pressure from one side of the piston to the other and thereby reduce its sensitivity to variations in fluid pressure on one side thereof, and in case the leakage becomes sufficiently great it might even result in failure of the piston to respond to a normal variation in fluid pressure. Moreover, the piston head or ring is liable to catch on a side of the grooves and require a greater than normal pressure differential to start it moving out of its release position. In such a case, when it does start moving, it might then jump or over travel a desired position and cause an undesired operation.

One object of the invention is therefore the provision of means for avoiding the above difficulty.

Another object of the invention is the provision of means for holding a piston head against radial movement relative to the wall of the bore in which it is disposed to operate.

Other objects and advantages will be apparent from the following more detailed description of the invention.

Figure 6:
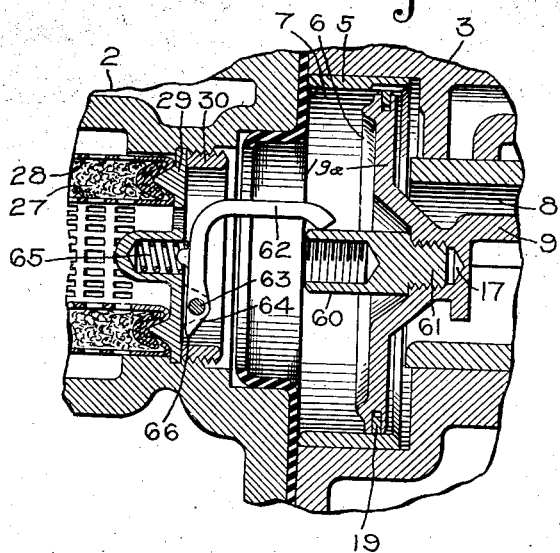
Figure 5:
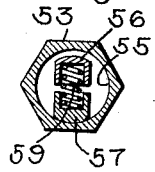
Figure 7:
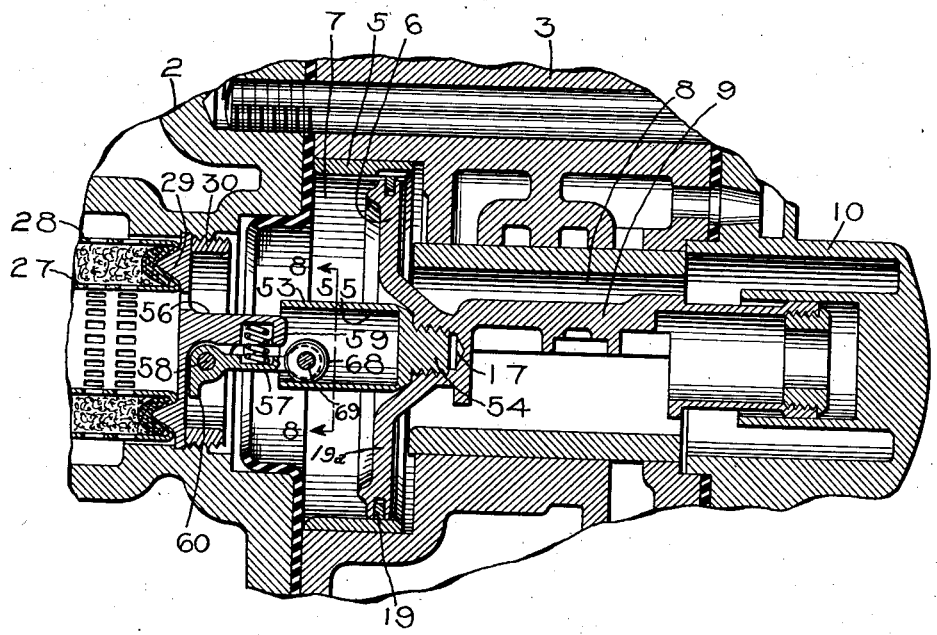
Figure 8:
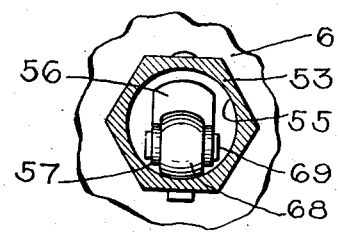

In the accompanying drawings: Fig. 1 is a sectional view of a portion of a fluid pressure brake device embodying one form of the invention; Figs. 2 and 3 are sectional views taken on the line 2—2 and 3—3 in Fig. 1; Fig. 4 is a sectional view of a portion of the valve device shown in Fig. 1 and embodying another form of the invention; Fig. 5 is a sectional view taken on the line 5—5 in Fig. 4; Figs. 6 and 7 are sectional views of a valve device similar to Fig. 4 but each embodying still another form of the invention; and Fig. 8 is a sectional view taken on line 8—8 in Fig. 7.

General description

The several embodiments of the invention are shown in the drawings associated with a portion or portions of a brake controlling valve device 1 which, for the purpose of illustration may be the well known AB type employed particularly on freight cars and which is disclosed in Patent 2,031,213 issued on February 18, 1936, to Clyde C. Farmer. Since reference may be made to this patent only those parts of the device are therefore shown in the drawings which are considered pertinent to the invention, and the following description thereof will also be limited to only that necessary for a clear comprehensive understanding of the invention.

As shown in the drawings, the brake controlling valve device 1 comprises a pipe bracket 2 on one face of which is removably mounted a service control portion 3 while on an opposite face is removably mounted an emergency control portion 4.

The service control portion 3 comprises a casing having a bore one end of which is closed by the bracket 2 and which is lined with a bushing 5 having in turn a bore in which is slidably mounted a service piston 6. On the bracket side of piston 6 is a brake pipe chamber 7 and at the opposite side a valve chamber 8. The piston 6 has a stem 9 projecting from one face through the valve chamber 8 with its outer end slidably supported in a bore provided in a cover 10. In the opposite face of the piston is a coaxially arranged screw-threaded bore 17 employed for mounting the piston to turn same during the process of manufacture.

The emergency control portion 4 comprises a casing having a bore closed at one end by the bracket 2 and lined with a bushing 11 in which an emergency piston 12 is mounted to reciprocate. The piston 12 has a brake pipe chamber 13 at the side adjacent the bracket 2 and a valve chamber 14 at the opposite side. A stem 15 projects from one face of the piston 12 through valve chamber 14 and its outer end is slidably supported in a bore provided in a cover 16 secured to the casing. The piston has in its opposite face a screw-threaded bore 18 for the same purpose as bore 17 in the service piston 6.

To provide a seal between the service and emergency pistons 6 and 12 and the bushings 5 and 11, respectively, each piston comprises a piston head 19a which is provided with a ring groove around its periphery and an expansive ring 19 is contracted into this groove and has sliding contact with the respective bushing. With the rings 19 in this working condition some clearance exists between the bottom of the ring grooves and the inner peripheries of the rings. Further, in accordance with conventional practice the heads 19a of the service and emergency pistons 6 and 12 are of a diameter which is slightly less than that of the bore in the respective bushings 5 and 11, as shown to an exaggerated degree in the drawings. A certain degree of relative movement is therefore possible between the piston heads 19a, and the bushings and rings diametrically thereof.

The service and emergency pistons 6 and 12 and the bores 17 and 18, respectively, in their adjacent faces are arranged in coaxial relation with each other at the opposite sides of the pipe bracket 2 and the brake pipe chambers 7 and 13 formed at the adjacent faces of said pistons are in constant communication with each other through the pipe bracket 2 by way of a communication which will now be described.

This communication comprises a central substantially cylindrical passage 25 which is open at one end to an enlarged passage 26 leading to the emergency piston chamber 15. At its opposite end the passage 25 is open to one end of a coaxially arranged cavity containing two spaced and concentrically arranged cylindrical screens 27 and 28 which are clamped between said one end of the cavity and a member 29 mounted in the opposite end and held in place by a screw ring 30. The passage 25 is open through the interior of the inner screen 27, an opening 31 in the member 29 and through the ring 30 to the service piston chamber 7. The annular space between the screens 27 and 28 is packed with any suitable air cleaning material such as curled hair, while around the outer screen 28 is an annular cavity 32 which is connected by passages (not shown) in the usual brake pipe (not shown) on the vehicle.

In practice, when fluid under pressure is supplied to the brake pipe for effecting a release of brakes on the vehicle, fluid flows from the brake pipe to the cavity 32 and thence through the cleaning device, including the screens 27 and 28 and curled hair therebetween, to the space within the inner screen 27 and thence in opposite directions to the service piston chamber 7 and emergency piston chamber 13, the strainer device acting at this time to prevent passage of foreign matter such as pipe scale from the brake pipe to said piston chambers. When the pressure in the brake pipe is reduced for effecting an application of brakes, a corresponding reduction in pressure in the service and emergency piston chambers 7 and 13 occurs through the connecting communication, the strainer device and thence by way of cavity 31, as will be apparent.

The several embodiments of the invention comprises means for holding a piston head against radial movement so as to avoid the development of grooves in the wall of the bore in which the piston head operates, as above described. For the purpose of illustration these means may be applied to either one or both of the service and emergency pistons 6 and 12, respectively as will now be described.

*Description—Figure 1*

According to this embodiment of the invention, a sleeve 35 disposed in the service piston chamber 7 is rigidly connected to the service piston 6 by screw-threaded contact between a stud 36 provided on one end of the sleeve and the screw threads in bore 17. This sleeve has a bore 37 open at the outer end of the sleeve, that is, the end adjacent the pipe bracket 2, and the bottom of this bore is open to the piston chamber 7 through a breather port 38. A like sleeve 39 disposed in the emergency piston chamber 13 is rigidly secured to the emergency piston 12 by screw-threaded engagement between a stud 40 provided on one end of the sleeve and the threads in the bore 18. The sleeve 39 also has a bore 41 open at the end of the sleeve adjacent the pipe bracket 2 and the bottom of this bore is open to the piston chamber 13 through a breather port 42.

The bores 37 and 41 in the two sleeves 35 and 39 are formed in coaxial relation with the respective pistons and thus with each other and are also in like relation with passage 25 and the inner screen 27 provided in the pipe bracket 2.

A rod 43 extending through the communication in the pipe bracket 2 connecting the service and emergency piston chambers 7 and 13 has its opposite ends slidably mounted in the bores 37 and 41 in sleeves 35 and 39, respectively, associated with the service and emergency pistons. A leaf spring 44 has one end secured by rivets 45 to the rod 43 adjacent the inner end of screen 27, while the opposite end of the spring has sliding contact with the rod. Between its ends the spring 44 bears against the wall of passage 25. When the rod 43 and spring 44 are assembled in the pipe bracket 2 in their working condition, as shown in Fig. 1, the spring 44 is compressed and its pressure on the rod 43 is applied to the sleeve 41 associated with the head 19a of the emergency piston 12 and urges said piston head radially, as in a downwardly direction as viewed in Fig. 1, into contact with one side of the bore in bushing 11.

At one side of or below the rod 43 the member 29 is provided with a pin 46 projecting from the face adjacent the service piston 6 into the opening through the screw ring 30. A coil spring 47 wrapped or looped around the rod 43 within the ring 30 has its opposite ends connected to the pin 46. This spring is under tension and thereby acts to pull the engaged portion of rod 43 in a downwardly direction, as viewed in the drawings, and through the medium of the connection between said rod and sleeve 35 associated with the head 19a of the service piston 6, said spring acts to pull said head radially into engagement with one side of the wall of the bore in bushing 5.

The head 19a of the service piston 6 is thus biased radially into contact with bushing 5 by spring 47 acting on the rod 43 near one end thereof, while the head 19a of the emergency piston 12 is biased radially into contact with bushing 11 by leaf spring 44 acting on rod 43 near the opposite end, and the pressure of these springs on the two piston heads is just sufficient to hold the piston head against vibration radially so as to avoid development of undersirable conditions such as above described.

The opening 31 through member 29 is of greater diameter than rod 43 and is located off-center of said member (Figs. 1 and 2) and is open at one side to a relatively narrow slot 48 which passes through the center of said member. The opposite side walls 49 of this slot extend into grooves 50 (Fig. 3) provided in the opposite sides of rod 43 and act to hold the rod against longitudinal movement relative to the bracket 2 so as to thereby maintain contact between the opposite ends of the rod and sleeves 35 and 39 associated with the service and emergency pistons upon movement of said pistons.

In practice the rod 43 is applied to the pipe bracket before either the service or emergency portion 3 or 4 is applied to the bracket. To apply the rod it is inserted through the passages 25 and 26 and into the inner strainer screen 27. The end of the rod is then threaded through the opening 31 in member 29 to a position in which the slots 50 become aligned with the side walls 49 of slot 48 in said member and then the rod is lowered into said slot to its working position shown. Next the coil spring 47 is applied and its pressure applied to the rod 43 urges same into engagement with the bottom of the slot 48. The slot 48 is of such depth however as to support the adjacent end of the rod 43 for entry into the bore 37 in sleeve 35 associated with the service piston 6 when the service portion 3 is mounted on the pipe bracket 2, it being noted that the open end of bore 37 is flared outwardly to facilitate such entry.

Below the leaf spring 44 a pin 51 is provided in the rod 43 to engage the wall of passage 25 for supporting the adjacent end of the rod in a position to enter bore 41 in sleeve 39 associated with the emergency piston 12 when the emergency portion 4 of the valve device is applied to the pipe bracket, the open end of bore 41 being also flared outwardly to facilitate such entry.

After the rod 43 is applied to the bracket 2 as above described, the service portion 3 may be mounted on the pipe bracket 2 and secured in place in the usual manner and during such mounting the one end of the rod 43 will enter the bore 37 in sleeve 35 and the rod where it passes through the member 29 will be lifted out of contact with the bottom of slot 48. The emergency portion 4 may then be applied to the pipe bracket 2 and during this act the adjacent end of rod 43 will enter the bore 41 in sleeve 39 and be lifted to a position in which the pin 51 is out of contact with the wall of passage 25. With the parts thus assembled it will be seen that the springs 47 and 44 will be effective to urge the heads 19a of the service piston 6 and emergency piston 12 into contact with one side of their respective cylinder walls with a force such as to just prevent radial movement between the piston heads and cylinder walls and thus avoid grooving of the cylinder walls, such as hereinbefore described.

*Description—Figure 4*

According to this embodiment, a piston which may be like piston 6 of Fig. 1 is provided with a sleeve 53 secured to the piston by screw-threaded contact between a stud 54 provided on one end of the sleeve and screw threads in bore 17 in the piston. This sleeve has a bore 55 open at the outer end of the sleeve. The strainer retaining member 29 is provided with an integrally formed finger 56 projecting into the bow 55, and below this finger is a pressure element 57 which is fulcrumed at the base of the finger on a pin 58, secured to said member. The pressure element 57 terminates at the end of finger 56 and between said element and finger is interposed an initially compressed coil spring 59 which is effective to urge the element 57 away from the finger 56 and into sliding contact with the wall of bore 55 within the sleeve 53. The pressure element 57 below the fulcrum pin 58 is provided with a stop 60 arranged to engage the member 29 when the service control portion 3 with piston 6 is removed from the bracket 2 for thereby limiting movement of the pressure element 57 away from the end of finger 56 to a degree such that said element will enter the bore 55 in sleeve 53 when the service control portion 3 is mounted on the pipe bracket 2.

When these parts are assembled as shown in Fig. 4, it will be noted that the stop 60 is out of contact with the member 29, under which condition, the end of the pressure element 57 is pressed by spring 59 into contact with the wall of bore 55 and thereby acts to urge the piston head 19a radially into contact with a portion of the bushing 5. The force of spring 59 thus applied to the piston head is such as to just hold said head against radial movement relative to the bushing 5 to avoid grooving of said bushing under vibrating conditions such as above described.

*Description—Figure 6*

In this embodiment of the invention a piston, such as the service piston 6, is provided with a sleeve 60 secured to the piston by a stud 61 having screw-threaded connection within bore 17. The outer surface of sleeve 60 is arranged for engagement by one end of a right angle shaped lever 62, the opposite end of which is fulcrumed on a pin 63 carried by ears 64 projecting from the strainer retaining member 29. Back of the lever 62 the retaining member 29 is provided with a recess which contains a spring 65 interposed between the bottom of said recess and the lever 62. This spring is under compression and therefore effective to rock the lever 62 in a clockwise direction for applying the pressure of the spring to the outer surface of sleeve 60 at right angles to the axis of said sleeve so as to thereby urge the head 19a of piston 6 radially into contact with one side of bushing 5 for holding the piston head against radial movement relative to said bushing for reasons hereinbefore described. A lug 66 projects from the lever 62 for engagement with member 29 to limit movement of said lever by spring 65, when the service control portion 3 is removed from the bracket 2, to such a degree that the end of the lever will of itself move into working relation with sleeve 60 when the service control portion 3 is assembled on the pipe bracket 2. The leading edge of the end of lever 62 which engages the sleeve is tapered to facilitate movement of the lever to its working position in the act of assembly just described. When these parts are assembled the lug 66 is out of contact with member 29.

Description—Figures 7 and 8

This embodiment of the invention is similar to that shown in Fig. 4 except that in the end of lever or pressure element 57 is mounted a roller 68 for contact with the surface of bore 55 within the sleeve 53 so as to thereby eliminate sliding friction between the pressure element 57 and sleeve 53, such as exists in the structure shown in Fig. 4, and as a result provide for the piston 6 being more sensitive or responsive to a change in pressure on one side or the other. The roller 68 is mounted on a pin 69 carried in the end of the pressure element 57 and if desired anti-friction bearings may be interposed between this pin and roller.

Summary

It will now be seen that various arrangements embodying pressure exerting means such as springs have been provided for applying a radially acting force to a piston head for biasing same into contact with one side of the wall of the piston cylinder or bore in which it is arranged to reciprocate, with a force just sufficient to prevent relative movement between the piston head and wall due to vibration of the device incident to shocks to which it is subjected in service. Grooving of the cylinder wall and consequent failure of a device to operate as intended will thereby be avoided.

Each of the several embodiments of the invention shown in Figs. 4 to 8 is applicable to any single piston such as piston 6 of the service control portion 2, as above described. The structures in all these embodiments act in substantially the same manner, but the arrangements shown in Fig. 7 minimizes friction between the pressure element and piston so as to minimize the effect friction has upon movement of the piston in response to a change in fluid pressure on one face.

The embodiment shown in Fig. 1 is particularly applicable to a device like the well known AB valve in that it provides for holding both the oppositely disposed heads of the service and emergency pistons against vibration, the pipe bracket 2 of this valve being of such design as to accommodate the rod 43 and other parts of this apparatus. With this structure the screw-threaded nut heretofore used for holding the air strainer in place is replaced by the retaining member 29 and ring nut 30.

To apply any of the above described arrangements to a piston such as used in air brake devices, it is only necessary to apply to the bore already existing in the piston head, a sleeve such as sleeve 35, 39, 53, or 61, according to the structure employed, for receiving pressure from the pressure transmitting device and transferring same to the respective piston head.

In all embodiments of the invention the pressure transmitting arrangement has been shown as arranged to urge the piston head into contact with its cylinder bore at the lowermost portion thereof, as viewed in the drawings. It is desired to point out that this however is merely illustrative, since the invention contemplates an arrangement for urging the piston head radially in any direction, such as into contact with the top of cylinder or one side thereof.

Having now described my invention, what I claim as new and desire to secure by Letters Patent, is:

1. In combination, a casing having a piston bore, a piston head mounted to reciprocate in said bore and having a valve operating piston stem, and pressure exerting means acting radially on said piston head independently of said stem urging said head against the wall of said bore.

2. In combination, a casing having a bore, a piston head mounted to reciprocate in said bore and having a valve operating piston stem, a member arranged to urge said piston radially against the wall of said bore independently of said stem, and pressure exerting means acting on said member for actuating same.

3. In combination, a casing having a piston bore open at one end, a piston head mounted to reciprocate in said bore, a member closing the open end of said bore, and pressure exerting means carried by said member and arranged to act on said piston head radially for urging said piston against the wall of said bore.

4. In combination, a casing having a piston bore, a piston head mounted to reciprocate in said bore and having a valve operating piston stem, a member having a connection with said piston head independent of said stem for urging said piston head radially against the wall of said bore and providing for reciprocatory movement of said piston head relative to said member, and pressure exerting means acting on said member for actuating same to press said piston head against the wall of said bore.

5. In combination, a casing having a piston bore, a piston head mounted to reciprocate in said bore, a member having a connection with said piston head for urging same radially against the wall of said bore and providing for reciprocatory movement of said piston head relative to said member, pressure exerting means acting on said member for actuating same to press said piston head against the wall of said bore, and a roller in the connection between said member and piston head for limiting resistance to reciprocatory movement of said piston head relative to said member due to force of said pressure exerting means.

6. In combination, a casing having a piston bore, a piston head mounted to reciprocate in said bore, a member rigidly associated with said piston head, and an element fixed with respect to said casing and cooperative with said member for urging said piston head radially against the wall of said bore and providing for relative movement between said member and element upon reciprocation of said piston head.

7. In combination, a casing having a piston bore, a piston head mounted to reciprocate in said bore, a member projecting from said piston head, a rockable element engaging said member at substantial right angles to the axis of said piston head, and spring means acting on said element for urging same against said member to thereby urge said piston head against the wall of said bore.

8. In combination, a casing having a piston bore, a piston head mounted to reciprocate in said bore, a member projecting from and having a surface parallel to the axis of said piston head, a rockable element having one end movable in a direction generally radial of said piston head, a roller carried by said member and arranged to engage said surface, and spring means acting on said element for rocking same and thereby said roller into engagement with said member for urging said piston head radially against the wall of said bore.

9. In combination, a valve device having a piston chamber open at one end, a piston head mounted to reciprocate in said chamber, a rigid element extending from said piston head into said chamber and having a surface parallel to the axis of said piston head, a member closing the open end of said chamber, a pressure device carried by said member and extending into said chamber and engaging said surface, and spring means carried by said member acting on said pressure device urging same in a direction radially of said piston head against said surface for thereby urging said piston head radially against the wall of said chamber.

10. In combination, a valve device having a piston chamber open at one end, a piston head mounted to reciprocate in said chamber, a rigid element extending from said piston head into said chamber and having a surface extending parallel to the axis of said piston head, a member closing the open end of said chamber, and a pressure device carried by said member comprising a rigid finger projecting from said member over said surface, a lever disposed between said finger and surface and pivotally connected with said member to provide for movement of said lever in a direction radially of said piston head into contact with said surface, and spring means under pressure interposed between said finger and lever urging said lever against said surface to thereby press said piston head radially against the wall of said chamber.

11. In combination, a valve device having a piston chamber open at one end, a piston head mounted to reciprocate in said chamber, a rigid element extending from said piston head into said chamber and having a surface extending parallel to the axis of said piston head, a member closing the open end of said chamber and a pressure device carried by said member comprising a rigid finger projecting from said member over said surface, a lever disposed between said finger and surface and pivotally connected with said member to provide for movement of said lever in a direction radially of said piston head into contact with said surface, a roller bearing in the end of said lever for engaging said surface, and spring means under pressure interposed between said finger and lever forcing said roller against said surface to thereby urge said piston head radially into contact with the wall of said chamber.

12. In combination, a valve device having a piston chamber open at one end, a piston head mounted to reciprocate in said chamber, a member closing the open end of said chamber, a sleeve removably secured to said piston head in axial relation and projecting therefrom in the direction of said member, lever means carried by and pivotally mounted on said member and having one end arranged upon movement in a direction radially of said piston head to engage said sleeve, and spring means carried by said member acting on said lever urging same into engagement with said sleeve for thereby pressing said piston head against the wall of said chamber.

13. In combination, a valve device having a piston chamber open at one end, a piston head mounted to reciprocate in said chamber, a member closing the open end of said chamber, a sleeve removably secured to said piston head in axial relation and projecting therefrom in the direction of said member, a finger projecting from said member into said sleeve, a lever having a pivotal connection with said member and extending into said sleeve at one side of said finger, and spring means interposed between said finger and lever urging said lever into contact with said sleeve to thereby force said piston head into contact with the wall of said chamber.

14. In combination, a valve device comprising a casing having a piston chamber open at one end, a piston head mounted to reciprocate in said chamber, a cover removably secured to said casing closing the open end of said chamber, a member rigidly secured to said piston head and projecting into said chamber and having a surface parallel to the axis of said piston head, a lever having a pivotal connection with said cover and having one end disposed upon radial movement to engage said surface, spring means acting on said lever for urging same against said surface to thereby urge said piston head against said cylinder wall, and means for limiting movement of said lever by said spring means upon disengagement of said lever and surface to facilitate movement of said lever into working relation with said surface upon mounting said cover on said casing.

15. A valve device comprising in combination a casing having a piston bore open at one end, a cover member removably mounted on said casing over the open end of said bore closing same, means securing said casing and cover member together, a piston head mounted to reciprocate in said bore, a sleeve secured to said piston head axially thereof and projecting into said bore in the direction of said cover member, a rod disposed in said cover member and projecting into said sleeve, and spring means associated with said cover member and acting on said rod urging same radially of said sleeve into contact therewith for thereby urging said piston head radially into contact with the wall of said bore.

16. A valve device comprising in combination a casing having a piston bore open at one end, a cover member removably mounted on said casing over the open end of said bore closing same, means securing said casing and cover member together, a piston head mounted to reciprocate in said bore, a sleeve secured to said piston head axially thereof and projecting into said bore in the direction of said cover member, a rod disposed in said cover member and projecting into said sleeve, spring means associated with said cover member and acting on said rod urging same radially of said sleeve into contact therewith for thereby urging said piston head radially into contact with the wall of said bore, and means for limiting movement of said rod in a direction radially of said piston head to a degree providing for entrance of said rod into said sleeve upon mounting of said casing against said cover means.

17. In combination, a bracket having two oppositely disposed mounting faces, a valve device removably mounted on one of said faces and having a piston bore, another valve device removably mounted on the opposite face and having a piston bore, said piston bores being in coaxial alignment and said bracket having a communication connecting said bores, a piston head mounted to reciprocate in each of said bores, means associated with each of said piston heads providing on the side of said heads adjacent said bracket a surface arranged parallel to the axis of the respective piston, a rod extending through said communication and bearing at opposite ends on said surfaces, and spring means in said bracket acting on said rod urging same in a direction radially of said piston head against said surfaces to thereby apply radial force to said piston heads for urging same against the wall of the respective bores.

18. In combination, a bracket having two oppositely disposed mounting faces, a valve device mounted on one of said faces having a piston bore one end of which is closed by the adjacent bracket face, another valve device mounted on the opposite bracket face and having a piston bore one end of which is closed by the adjacent bracket face, the two piston bores being arranged in coaxial relation and said bracket having a communication connecting said chambers and arranged in coaxial relation therewith, a piston head mounted to reciprocate in each of said bores, a sleeve rigidly secured to each of said piston heads axially thereof and projecting from the piston head in the direction of said communication, a rod extending through said communication and having its opposite ends disposed in said sleeves secured to the two piston heads, and spring means associated with said bracket and acting on said rod for urging same in a direction radially of said piston heads to thereby apply force to said sleeves and piston heads for urging said piston heads radially into contact with their respective piston bores.

19. In combination, a bracket having two oppositely disposed mounting faces, a valve device mounted on one of said faces having a piston bore one end of which is closed by the adjacent bracket face, another valve device mounted on the opposite bracket face and having a piston bore one end of which is closed by the adjacent bracket face, the two piston bores being arranged in coaxial relation and said bracket having a communication connecting said chambers and arranged in coaxial relation therewith, a piston head mounted to reciprocate in each of said bores, a sleeve rigidly secured to each of said piston heads axially thereof and projecting from the piston head in the direction of said communication, a rod extending through said communication and having its opposite ends disposed in said sleeves secured to the two piston heads, means securing said rod against longitudinal movement relative to said bracket, means providing for movement of said rod radially relative to said piston heads, spring means acting on said rod urging same radially against said sleeves for thereby urging said piston heads against the walls of their respective bores, and means for limiting radial movement of said rod under action of said spring means to a degree providing for entrance of said rod into said sleeves upon mounting said valve devices on said bracket.

20. A valve device comprising a bracket having two oppositely disposed mounting faces, a valve device mounted on each of said faces having a piston bore one end of which is closed by the respective bracket face, a piston head mounted to reciprocate in each of said bores, said piston heads and bores being arranged in coaxial relation, a sleeve rigidly secured to each of said piston heads axially thereof and projecting therefrom in the direction of said bracket, said bracket having a communication arranged in coaxial relation with and connecting said chambers and comprising adjacent one of said bracket faces a cylindrical portion and adjacent the other bracket face an enlarged portion, a strainer device disposed in said enlarged portion comprising an inner screen portion connecting the adjacent end of said cylindrical portion to the opposite bracket face, a member removably secured to said bracket and engaging one end of said strainer device securing same in place, a rod extending through said communication and having its opposite ends disposed in said sleeves, a leaf spring carried by said rod and slidably engaging said cylindrical portion for urging the adjacent end of said rod and thereby the adjacent sleeve and piston head radially of the piston bore to force the piston head against the wall of the bore, and a coil spring carried by said member acting on the adjacent portion of said rod for urging same and thereby the adjacent sleeve end piston head radially in its piston bore against the wall thereof.

JOHN N. GOOD.